Sept. 16, 1952 F. H. OWENS 2,610,904

RECORD MAGAZINE

Filed Aug. 18, 1948 3 Sheets-Sheet 1

INVENTOR.
FREEMAN H. OWENS
BY
Philip S. McLean
ATTORNEY

Sept. 16, 1952 F. H. OWENS 2,610,904

RECORD MAGAZINE

Filed Aug. 18, 1948 3 Sheets-Sheet 2

INVENTOR.
FREEMAN H. OWENS
BY
Philip S. McLean
ATTORNEY

INVENTOR.
FREEMAN H. OWENS
BY
Philip S. McLean
ATTORNEY

Patented Sept. 16, 1952 2,610,904

UNITED STATES PATENT OFFICE 2,610,904

RECORD MAGAZINE

Freeman H. Owens, New York, N. Y.

Application August 18, 1948, Serial No. 44,852

12 Claims. (Cl. 346—136)

The invention here disclosed relates to record magazines of the type used in the listener preference recording systems disclosed in copending patent application Serial No. 502,717, filed September 15, 1943, now Patent 2,514,086, July 4, 1950, and earlier filed patent applications identified therein, and patent application Serial No. 19,064, filed April 5, 1948, of which this is a continuation in part.

Reference here is also made to copending patent application Serial No. 566,787, filed December 6, 1944, now Patent No. 2,564,920, August 21, 1951, and earlier filed patent applications identified there, disclosing in detail the nature of the record strips or tapes used in such magazines.

The general objects of the present invention are to provide a record magazine which will properly safeguard the record strip, tape or film, hold it and maintain it in proper relation for cooperation with the record making elements of the recording machine, which will be quickly applicable to or removable from the machine with which it is intended to be used and which with all these advantages will be of simple, inexpensive construction and small in size and light in weight so that it may be easily and conveniently handled, shipped through the mail or otherwise transported, as may be required.

Particular objects of the invention are to insure the holding of the tape or recording element in taut or properly positioned condition at the recording window or station and to make sure that the record element will be so maintained even during shipment and handling operations apart from the machine.

Further special objects of the invention are to insure that while the record element will be properly held or actually locked in position while the magazine is separated from the machine, it will, with equal certainty, be unlocked and thus released for operation by the drive mechanism of the machine when the magazine is placed in cooperative association with the machine.

A related object of the invention is to actually prevent the magazine from being inserted in the machine until the spooling mechanism or other record transposing mechanism is released or unlocked and hence made ready to cooperate with the recording mechanism.

Other desirable objects attained by the invention are set forth or will appear in the course of the following specification.

The drawings accompanying and forming part of the specification illustrate certain present preferred embodiments of the invention. Structure and arrangement, however, may be further modified and changed as regards such illustration, all within the true intent and broad scope of the invention as hereinafter defined and claimed.

Fig. 1 in the drawings is a vertical sectional view, with parts broken away, of one of the record magazines mounted in recording position in the machine with which it is intended to cooperate, locked in place and with the spooling mechanism released;

Figure 5:
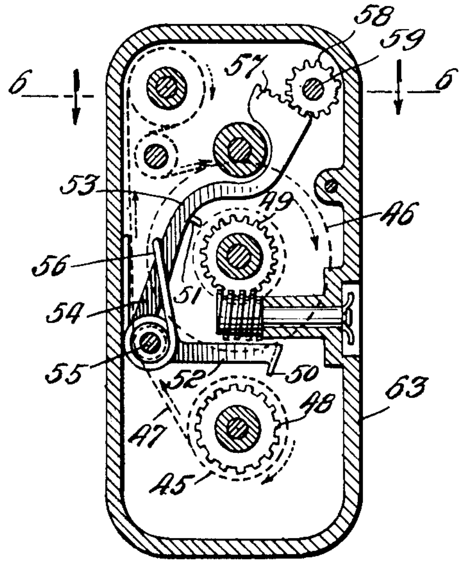
Figure 7:
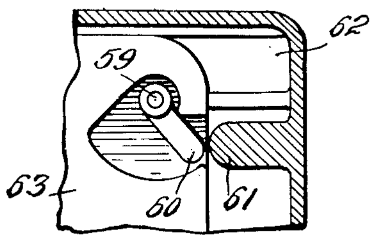
Figure 8:
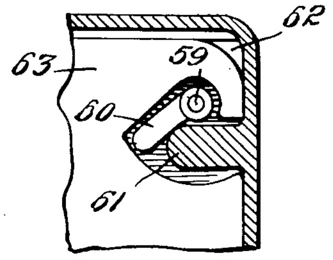
Figure 6:
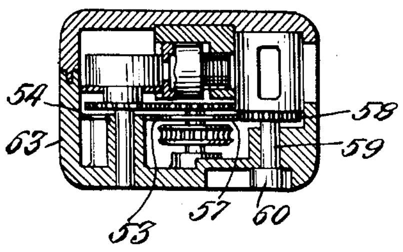
Figures 9, 10, 11:
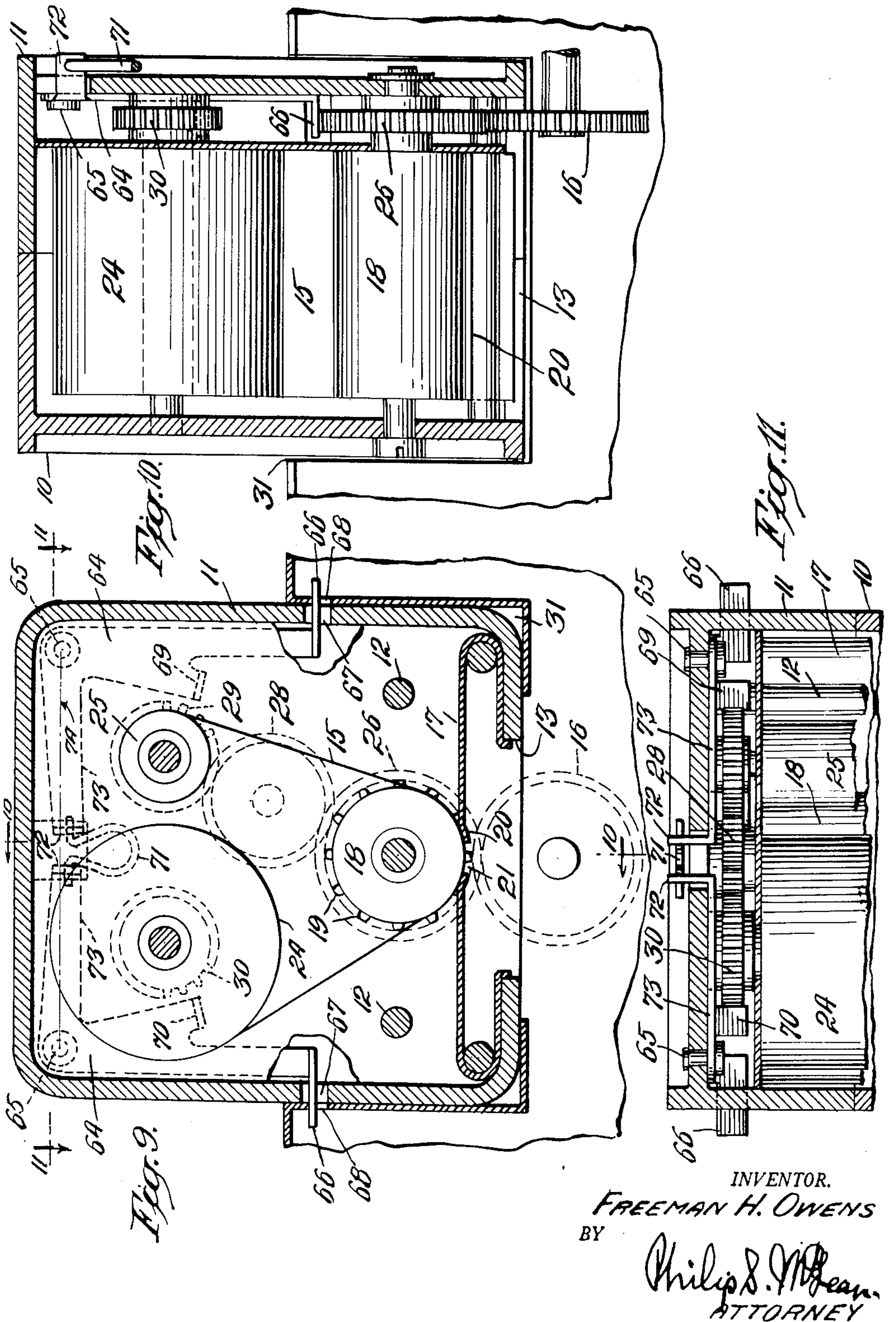

Figs. 5 to 8 are illustrations of a form of magazine for carrying a photographic record strip, as disclosed in co-pending patent application Serial No. 19,064, Fig. 5 being a vertical sectional view of the magazine, Fig. 6 a horizontal sectional view as on line 6—6 of Fig. 5, and Figs. 7 and 8 being enlarged broken sectional details of the coacting elements for effecting unlocking of the spooling mechanism when the magazine is inserted in the recorder structure;

Figs. 9, 10 and 11 are views illustrating a modified form of record magazine on the order of that first illustrated, Fig. 9 being a broken front vertical sectional view, Fig. 10 a similar view at right angles as on line 10—10 of Fig. 9, and Fig. 11 a broken sectional and plan view as on line 11—11 of Fig. 9.

The body or casing of the magazine is shown in Figs. 1 to 4 as made up of two halves or companion sections 10 and 11 releasably secured together as by means of through screws indicated at 12. These parts may be of molded plastic, metal, wood or other light, strong material.

A special feature of this casing is that it is open at one side, in this case across the bottom, in the form of a slot or window 13, to admit the recording elements 14 which cooperate with the tape 15 and the gearing 16 of the machine which effects the drive of the spooling mechanism in the magazine.

At the recording or printing point the tape is held taut and smooth by a spring plate 17 against a platen roller 18 which is shown in this case as equipped with sprocket teeth 19 to engage corresponding openings in the record strip.

The tape clamping plate 17 is shown as having a concaved central portion 20 fitting the contour of the roller, slotted at 21 to expose the width of the tape to the printing or recording elements 14.

The ends of the clamping plate are shown reversed or turned under at 22 to provide spring arms positioning and tensioning the plate in the supporting cavities 23 in the bottom portion of the casing above and at opposite sides of the main opening 13.

The course of the tape over the platen roll 18 is from a supply reel or spool 24 to a take-up reel or spool 25.

The take-up spool is shown as driven through a train of gearing from the drive gear 16 of the machine and consisting of a gear 26 on the sprocket roll shaft 27, positioned to mesh the gear 16 when the magazine is placed in the machine, an idler 28 in mesh with gear 26 and a gear 29 on the take-up spool in mesh with the idler.

The supply spool 24 is also shown as having a gear 30 like gear 29 but this is for locking purposes, as will appear.

To locate and hold the magazine in proper relation to the recording mechanism, the recording machine is shown as having a seat or pocket 31 to receive the bottom, open end of the magazine and latch levers 32 pivoted at opposite sides of the seat and having lugs or tongues 33 to enter locking notches 34 in the opposite sides of the casing.

The latch levers 32 are further shown as drawn inward into locking engagement with the casing by a spring 35 and as having grips or finger lugs 36 by which they may be opened to release the magazine.

Figures 1, 2, 3, 4:
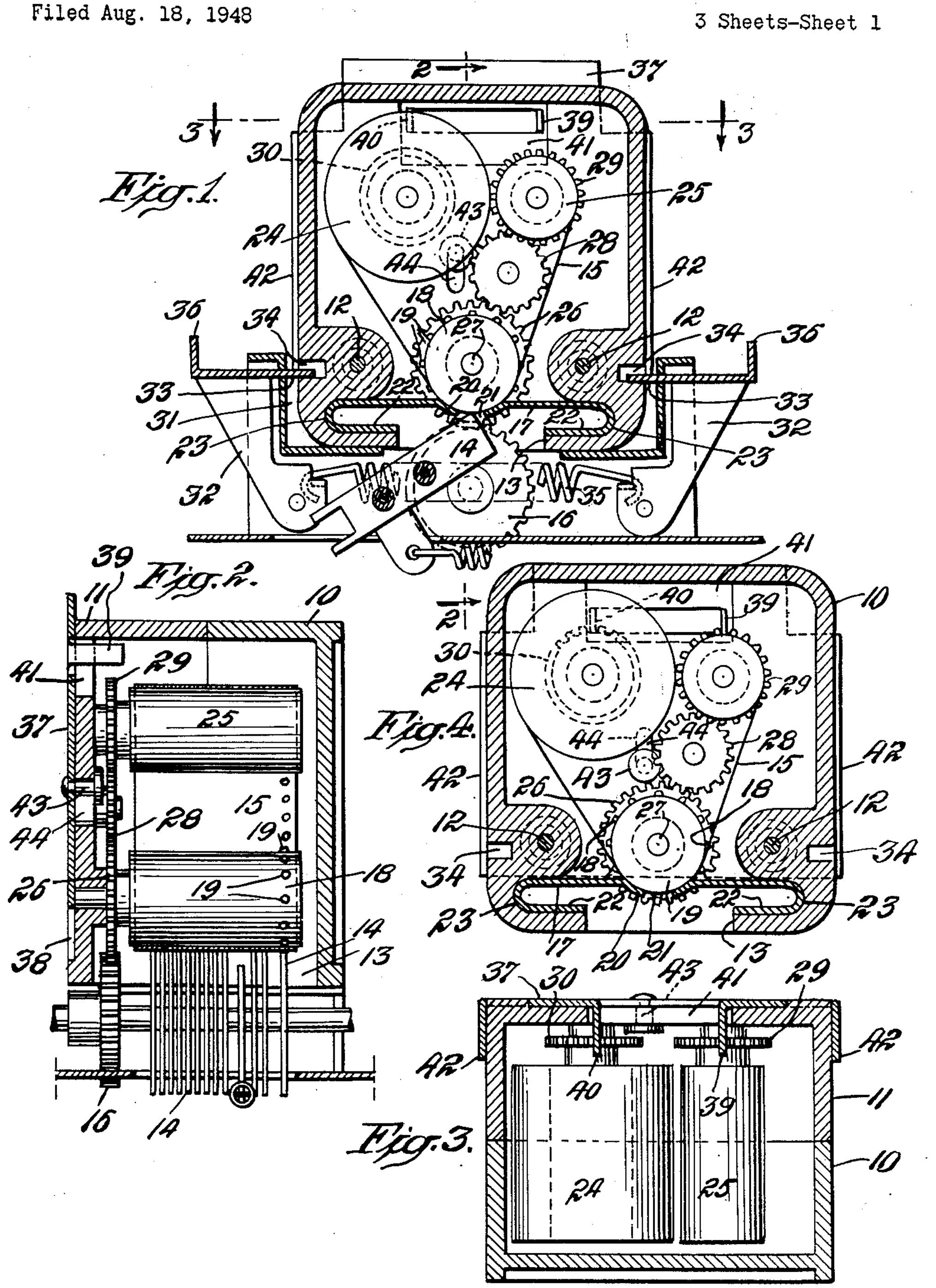
Fig. 2 is a broken vertical sectional view as taken on substantially the plane of line 2—2 of Fig. 1.
Fig. 3 is a horizontal sectional view as on substantially the plane of line 3—3 of Fig. 1.
Fig. 4 is a vertical sectional view of the magazine separated from the machine and the spooling mechanism secured in locked relation.

To lock the tape when the magazine is removed from the recording machine and to then unlock the tape and insure that the magazine will not be placed in the machine until the tape is actually unlocked, there is provided in Figs. 1 to 4 a locking slide 37 operating flush in a cavity 38 formed in the back of the case and carrying lugs 39, 40, projecting forwardly through an opening 41 in the back wall into position to engage and interlock with the gears 29 and 30 of the take-up and supply spools and carrying flanges 42 at the upright edges thereof projecting about the sides of the casing far enough to partially cover the notches 34 and to engage the latch tongues 33, as indicated in Fig. 1.

The locking plate is shown as slidingly confined on the back of the case by a headed stud 43 riveted to the plate through a slot 44 in the back wall and slidingly operating over the inner face of this wall. This securing stud tensions the plate against the back wall so that it will hold in the position in which it has been set, either lowered as in Fig. 4, covering the locking notches 34, or raised as in Fig. 1, uncovering these notches and permitting locking engagement of the latches with the magazine.

The parts may be so constructed that the magazine may be forced down into its seat and so that in this movement the latch lugs 33 will be engaged by the flanges 42 of the locking plate, holding that plate back and permitting the magazine to continue its movement down into finally seated position where, as shown in Fig. 1, the latches will then snap into engagement with the notches 34 to secure the magazine in position with the drive gear 16 meshing with the drive train of the spooling mechanism and the record strip exposed at 21 for cooperation with the markers 14 of the recording machine.

When removed from the machine the locking plate 37 may slip down into position covering the notches 34, as in Fig. 4, or be slid to that position by hand or possibly by a return spring tensioned to shift and hold the plate in the locking position covering notches 34 and with lugs 39, 40, engaged with gears 29, 30, of the take-up and supply spools 25 and 24.

The locking slide may be slid into locked position, for example in a mailing case or the like, constructed to receive the magazine, or by means of a paper sealing strip or wrapper placed about the magazine for handling, mailing, shipping or storage purposes.

The form of the invention illustrated in Figs. 5 to 8 involves supply and take-up reels 45, 46, for a sensitized photographic recording strip 47 or the like, said spools having gears 48, 49, engageable by teeth or locking lugs 50, 51, on the angularly related arms 52, 53, of a lever 54 pivotally mounted at 55 and urged in the locking direction by a spring 56.

One arm of this lever is shown as carrying a gear segment 57 engaged by a pinion 58 on a shaft 59 having an exposed arm 60 for engagement by a projection 61 in the seat or receptacle 62 in which the casing 63 of this unit is designed to be mounted. In this construction the record carrying reels will be automatically locked when the magazine is removed from its seat in the recording mechanism and will be automatically unlocked in the act of placing the magazine in position for cooperation with the recording mechanism.

The form of the invention illustrated in Figs. 9, 10 and 11 is generally similar to that first described.

In this case, however, the locking mechanism for securing the magazine in place and the locking means for securing the record spools are combined.

Specifically this is accomplished by pivoting a pair of locking levers 64 at 65 on the back wall of the case and providing these with lugs 66 to project out through openings 67 in the case into locking openings 68 in the holder or mounting seat 31, said levers further carrying inwardly acting locking lugs 69, 70, to engage the gears 29, 30, on the take-up and supply reels, respectively.

These combination locking levers are biased in either the magazine locking position, with the levers projected to engage in a supporting seat as in Fig. 9, or in the reverse, retracted position with the locking lugs 66 withdrawn and the spool locking lugs 69, 70, engaged with the spool gears, by an expansion spring 71 interposed between lugs 72 at the inner ends of the toggle arms 73 of the levers.

These toggle arm extensions 73 of levers 64 are disposed to swing past the center line 74 connecting the pivotal mountings 65 of the levers, allowing sufficient range of movement for the lugs 66 to project into magazine locking position in travel in one direction, and for these lugs to be fully retracted and the lugs 69 and 70 to engage gears 29 and 30 in the opposite direction of movement.

The toggle spring 71 is shown as a U-shaped wire spring hooked at its ends into the lugs 72 so that it may be used as a convenient handle for shifting the toggle locking levers in opposite directions. In this form of the invention, with the toggle arms in the upper position (see Fig. 9) and the magazine locking lugs 66 withdrawn, the magazine may be freely inserted in its support, with the spooling mechanism in locked condition. Then upon depressing the handle spring 71 the toggle levers will snap downward to unlock the supply and take-up reels and to spring the locking lugs 66 outward into engagement in the locking openings 68, with the record strip exposed at 21 to receive the record impressions and the gear train engaged with the drive gear 16 for advancing the record in accordance with the inermittent record advancing movements of the recording mechanism.

When it is to be removed the magazine is unlocked from the recording machine by lifting the inner ends of the toggle levers at 71 and this action automatically locks the spooling mechanism so that the record will be held in place in the magazine.

It is contemplated that the structure may be further simplified by eliminating the intermediate or idler gear 28 and driving the take-up reel gear 29 directly from the gear 26, in which event the record tape would be unwound from the supply reel and rewound on the take-up reel at the inner sides, instead of at the outer sides of these reels, as illustrated in Fig. 9. Other changes may be made, all within the true intent and scope of the invention as hereinafter claimed.

What is claimed is:

1. A record magazine of the character disclosed comprising a case having means by which it may be accurately located and secured in position on a machine for making a record on record medium contained within the magazine, said case being open at one side to admit gearing present on the recording machine, spooling mechanism comprising a platen roll journaled in the case in line with the opening therein for supporting a record tape passing thereover in position to be marked by the record making means on said machine, supply and take-up spools journaled in the case in back of said platen roll for traversing the record strip over said platen roll and gearing for operating said platen roll and take-up spool and including a gear exposed at the opening in the case in position to mesh the drive gearing of the machine when the case is secured in the cooperative position described, and gears connected with said supply and take-up spools and a locking slide mounted on the back of the case and having lugs projecting into said case into position to engage said supply and take-up spool gears for holding said take-up and supply spools.

2. A record magazine of the character disclosed comprising a case having means by which it may be accurately located and secured in position on a machine for making a record on record medium contained within the magazine, said case being open at one side to admit gearing present on the recording machine, spooling mechanism comprising a platen roll journaled in the case in line with the opening therein for supporting a record tape passing thereover in position to be marked by the record making means on said machine, supply and take-up spools journaled in the case in back of said platen roll for traversing the record strip over said platen roll and gearing for operating said platen roll and take-up spool and including a gear exposed at the opening in the case in position to mesh the drive gearing of the machine when the case is secured in the cooperative position described, a locking slide mounted on the back of the case and having means for holding said take-up and supply spools, said locking slide further having means cooperative with said positioning and securing means to insure shifting of the locking slide to release position when the magazine is mounted in cooperative relation with the drive gearing aforesaid, the means for effecting accurate location and securing of the case in position including notches in the sides of the case to receive devices for securing the case to the recording machine and said means on the locking slide for insuring shifting of the slide to release position including portions of the slide located to cover said notches when the slide is in retracted position on the back of the case, the gearing including gears connected with the supply and take-up spools and the means for holding said take-up and supply spools including lugs on the locking slide positioned to interlock with said gears when the slide is in retracted position covering the notches and to be free of said gears when the slide is projected on the back to uncover said notches.

3. A record magazine of the character disclosed comprising a case having an opening, means within said case for traversing a record strip past said opening and including take-up and supply reels having gears, companion toggle levers pivotally supported in said case having lugs for locking engagement with said gears and shiftable inward to effect locking of the said reels and shiftable outward to effect releasing of same, retractable and extensible locking means operable by said levers, including lugs on said levers positioned for extension beyond and retraction into said case, for securing said case in fixed position or for releasing said case from a supporting holder, and spring means acting on said toggle levers for shifting said levers in opposite directions and holding them in their reversely shifted positions.

4. A record magazine of the character disclosed comprising a case having an opening, means within said case for traversing a record strip past said opening and including take-up and supply reels having gears, companion toggle levers pivotally supported in said case having lugs for locking engagement with said gears and shiftable inward to effect locking of the said reels and shiftable outward to effect releasing of same, retractable and extensible locking means operable by said levers, including lugs on said levers positioned for extension beyond and retraction into said case, for securing said case in fixed position or for releasing said case from a supporting holder, and spring means acting on said toggle levers for shifting said levers in opposite directions and holding them in their reversely shifted positions and including an expansion spring interposed between opposed projecting toggle arms of said levers and exposed at the back of the case for manual operation of the same.

5. A removable tape magazine, supply and take-up reels journaled in said magazine, a platen roll journaled in the magazine for supporting the tape in passage from the supply to the take-up reel, said platen roll having a gear for effecting the drive of the same and drive gearing between said platen roll and take-up spool, including a gear connected with the take-up spool, the supply spool also having a gear, and a slide on said magazine having lugs engageable with said gears for locking the supply and take-up spools against rotation and manually shiftable to effect release of said spools.

6. A removable tape magazine, supply and take-up reels journaled in said magazine, a platen roll journaled in the magazine for supporting the tape in passage from the supply to the take-up reel, said platen roll having a gear for effecting the drive of the same and drive gearing between said platen roll and take-up spool, including a gear connected with the take-up spool, the supply spool also having a gear, and a slide on said magazine having lugs engageable with said gears for locking the supply and take-up spools against rotation and manually shiftable to effect release of said spools, said magazine having locking notches by which the magazine may be secured in position on a recording machine and said slide having a portion to cover said locking notches in the position of the slide securing said spools.

7. A removable tape magazine, tape carrying supply and take-up spools within said magazine and provided with gears, spring toggle levers pivotally mounted in said magazine and spring tensioned in opposite directions beyond the dead center position, means operable in one position of said toggle levers and including lugs on said levers engageable with said gears for securing the supply and take-up reels, and manually operable means exterior of the magazine for effecting actuation of said levers in opposite directions.

8. A removable tape magazine, tape carrying supply and take-up spools within said magazine and provided with gears, spring toggle levers pivotally mounted in said magazine and spring tensioned in opposite directions beyond the dead center position, means operable in one position of said toggle levers and including lugs on said levers engageable with said gears for securing the supply and take-up reels, and manually operable means exterior of the magazine for effecting actuation of said levers in opposite directions and including a looped spring interposed between opposing ends of the levers and having a portion exposed to form a finger grip.

9. A removable tape magazine, tape carrying supply and take-up spools within said magazine and provided with gears, spring toggle levers pivotally mounted in said magazine and spring tensioned in opposite directions beyond the dead center position, means operable in one position of said toggle levers and including lugs on said levers engageable with said gears for securing the supply and take-up reels, and manually operable means exterior of the magazine for effecting actuation of said levers in opposite directions, said levers having magazine securing lugs arranged to project into securing position when the levers are in position releasing the spools and to be retracted when said levers are in position securing the spools.

10. A magazine for record tape comprising a small, flat case approximately large enough only to contain supply and take-up spools and an intermediate platen for a record tape, said case having an opening in the front of the same, a platen in the case in back of said opening to support record tape passing thereover in position to have record marks applied thereto through said opening, tape supply and take-up spools journaled in the case in back of said platen roll for supporting and traversing record tape from one spool to the other over said platen and gearing for driving said take-up spool and including a gear disposed in line with said opening in the case in position for meshing with a driving gear on a recording machine whereby to effect advance of the record tape in step with the recording machine upon locating said magazine with the opening in the front of the same in line with the companion recording and driving means of the recording machine, said supply and take-up spools having gears connected therewith and a manually shiftable device mounted on said case and having lugs positioned within the case to interlock with said supply and take-up spool gears upon movement of the same in one direction and to disengage said gears upon movement in the opposite direction.

11. A magazine for record tape comprising a small, flat case approximately large enough only to contain supply and take-up spools and an intermediate platen roll for a record tape, said case having an opening in the front of the same, a platen roll journaled in the case in back of said opening to support record tape passing thereover in position to have record marks applied thereto through said opening, tape supply and take-up spools journaled in the case in back of said platen roll for supporting and traversing record tape from one spool to the other over said platen roll and gearing for driving said take-up spool and including a gear disposed in line with said opening in the case in position for meshing with a driving gear on a recording machine whereby to effect advance of the record tape in step with the recording machine upon locating said magazine with the opening in the front of the same in line with the companion recording and driving means of the recording machine, and means for locking said gearing in the case to hold the record strip taut when the case is removed from the recording machine and including a shiftable operating member accessible at the outside of the case, an inwardly projecting lug carried by said member for locking engagement with said gearing when the case is removed from the recording machine and means controlled by said operating member for locking said case to the recording machine.

12. A magazine for record tape comprising a small, flat case approximately large enough only to contain supply and take-up spools and an intermediate platen roll for a record tape, said case having an opening in the front of the same, a platen roll journaled in the case in back of said opening to support record tape passing thereover in position to have record marks applied thereto through said opening, tape supply and take-up spools journaled in the case in back of said platen roll for supporting and traversing record tape from one spool to the other over said platen roll and gearing for driving said take-up spool and including a gear disposed in line with said opening in the case in position for meshing with a driving gear on a recording machine whereby to effect advance of the record tape in step with the recording machine upon locating said magazine with the opening in the front of the same in line with the companion recording and driving means of the recording machine and means for locking said gearing in the case to hold the record strip taut when the case is removed from the recording machine and including a shiftable operating member accessible at the outside of the case, an inwardly projecting lug carried by said member for locking engagement with said gearing when the case is removed from the recording machine and means controlled by said operating member for locking said case to the recording machine and including latch levers, the case having slots for said latch levers in opposite sides of the same in back of said opening in the front of the case.

FREEMAN H. OWENS.

REFERENCES CITED

The following references are of record in the file of this patent:

UNITED STATES PATENTS

| Number | Name | Date |
|---|---|---|
| 518,372 | Mackenstein | Apr. 17, 1894 |
| 1,367,268 | Kessler | Feb. 1, 1921 |
| 1,535,930 | MacDonald | Apr. 28, 1925 |
| 1,612,860 | Fairchild | Jan. 4, 1927 |
| 1,925,703 | Spence, Jr. | Sept. 12, 1933 |
| 1,935,210 | Hopkins | Nov. 14, 1933 |
| 2,011,350 | Wittel | Aug. 13, 1935 |
| 2,283,788 | Brechle et al. | May 9, 1942 |
| 2,380,034 | Doyle | July 10, 1945 |
| 2,391,497 | Wilson et al. | Dec. 25, 1945 |
| 2,403,587 | Doyle et al. | July 9, 1946 |
| 2,466,124 | Owens | Apr. 5, 1949 |